United States Patent [19]

Carr et al.

[11] Patent Number: 4,974,796

[45] Date of Patent: Dec. 4, 1990

[54] SONOBUOY DISPENSERS

[75] Inventors: Anthony E. Carr; Philip J. Withers, both of Yeovil, England

[73] Assignee: Normalair-Garrett (Holdings) Limited, Yeovil, England

[21] Appl. No.: 306,554

[22] Filed: Feb. 6, 1989

[30] Foreign Application Priority Data

Feb. 15, 1988 [GB] United Kingdom ................. 8803465

[51] Int. Cl.$^5$ ............................................. B64D 1/02
[52] U.S. Cl. .............................. 244/137.1; 224/118.1; 221/90
[58] Field of Search ............. 24/569, 525, 514; 74/99 R, 100 R, 101, 103, 105, 106, 820; 211/94, 162; 221/86, 82, 83, 90; 244/137.1, 137.4, 118.1; 318/762

[56] References Cited

U.S. PATENT DOCUMENTS

| | | | |
|---|---|---|---|
| 514,356 | 2/1894 | Frichette | 74/99 |
| 1,304,190 | 5/1919 | Moore et al. | 74/101 |
| 2,322,707 | 6/1943 | Wetzler | 24/525 |
| 3,478,616 | 11/1969 | Smith . | |
| 3,529,745 | 9/1970 | Freeman et al. | 221/90 |
| 3,593,085 | 7/1971 | Decker | 318/762 |
| 3,605,517 | 9/1971 | Seragnoli | 74/820 |
| 4,397,433 | 8/1983 | Guitaut | 244/118.1 |

Primary Examiner—Andres Kashnikow
Assistant Examiner—W. T. Waffner
Attorney, Agent, or Firm—Larson & Taylor

[57] ABSTRACT

A sonobuoy dispenser including a rotatable tubular cylinder having a plurality of adjustable sonobuoy support members longitudinally of its external surface is rotated and indexed by a power source and a Geneva mechanism controlled by a fiber optic switch members and an electronics control circuit further includes release for selectively releasing the sonobuoys.

3 Claims, 3 Drawing Sheets

SONOBUOY DISPENSERS

FIELD OF THE INVENTION

This invention relates to sonobuoy dispensers and is particularly concerned with rotary sonobuoy dispensers arranged to carry a mixture of different length sonobuoys.

DESCRIPTION OF THE PRIOR ART

GB-A-2072814A discloses a rotary dispenser in which indexing rotation of a buoy-carrying cylinder is achieved by means of a fixed electric motor having an output pinion in constant meshing engagement with an internally toothed annulus rigid with the cylinder. The cylinder is located in each indexed, dispensing, position by means of a wedge or key responsive to an electromagnet or pneumatic actuator that is adapted to engage a keeper at each buoy location.

In such an arrangement, two independent power sources are required to index the dispenser and to lock it in indexed positions. During rotation full motor output torque has to be reacted by the mated gearing, while to dispense a selected buoy, it is necessary to stop the rotation motor with the dispenser at the desired position, energise the locking actuator and insert the wedge or key: this time consuming sequence may mean that an unacceptable time lag is experienced in indexing between dispensing positions.

SUMMARY OF THE INVENTION

Accordingly, this invention provides a sonobuoy dispenser comprising a rotatable tubular cylinder having a plurality of sonobuoy support means longitudinally of its external surface, release means for selectively releasing the sonobuoys and a geneva mechanism operated by a power source for both indexing the cylinder and locking it in indexed positions.

The cylinder may be rotatably mounted concentrically of a central tubular pillar extending vertically from a base plate.

Said support means may include a tubular holder for locating a lower end of the sonobuoy and a cap member for locating the upper end, the cap member being slidable vertically in guide rails attached to the surface of the cylinder and including a manually operable spring loaded plunger for selective engagement in vertically spaced-apart holes in the cylinder whereby different length sonobuoys can be located.

Preferably, the geneva mechanism is an internal geneva mechanism comprising a rotor for rotation by the power source and having a convex semi-circular indexing surface at one end and a drive roller at its other end, said indexing surface co-operating during operation with a concave mating surface located internally of index plates secured internally of the cylinder at each sonobuoy location and said drive roller co-operating during certain phases of operation with a radially extending slot between adjacent index plates.

The power source may comprise a three phase AC electric motor and braking means may be provided to stop the motor with the cylinder at a predetermined position. Conveniently, the braking means may include switch means to switch the three phase power and apply a DC braking current to the motor.

The switch means may comprise fibre optic switch means and an electronics control unit and the fibre optic switch means may comprise a shutter rotatable with the cylinder and arranged to sequentially interrupt a light beam transmitted through fibre optic cable from the control unit.

The release means may include a linear solenoid connected through a mechanical linkage to pivot a retaining lever at the lower end of each tubular holder from a retaining position partially obstructing the lower end of the tubular holder to retain the sonobuoy and a release position clear of the lower end of the tubular holder to allow the sonobuoy to be released by gravity.

The mechanical linkage may include a generally vertical rod having a lower end connected through an over-centre mechanism to the retaining lever and an upper end connected through a force multiplying means to said linear solenoid. The force multiplying means may comprise a right angle lever pivoted to the pillar and having one arm pivotally attached to the upper end of the vertical rod and its other arm restrained for sliding movement in a longitudinal slot intermediate the ends of a lever having one end pivotally attached to the vertical rod downwardly from said upper end and the other end attached through a pivoted link to the end of a spindle operatively connected to said linear solenoid.

BRIEF DESCRIPTION OF THE DRAWINGS

The invention will now be described by way of example only and with reference to the accompanying drawings in which.

DETAILED DESCRIPTION OF THE DRAWINGS

Figure 1:
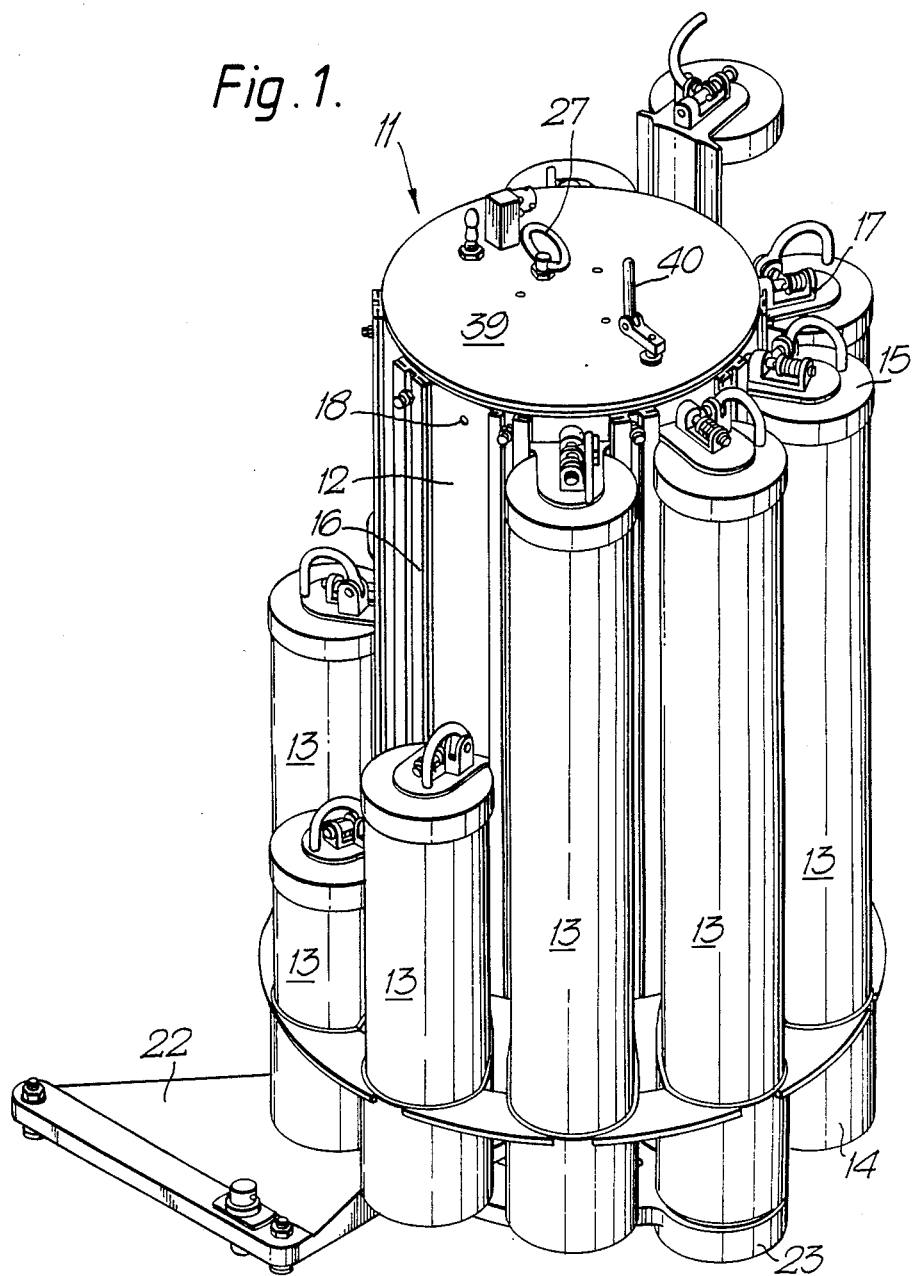
FIG. 1 is a perspective drawing of a sonobuoy dispenser according to the invention.

A sonobuoy dispenser 11 includes a rotatable tubular cylinder 12 capable of supporting ten sonobuoys 13 longitudinally of its external surface. Lower ends of the sonobuoys 13 are located in tubular holders 14 and the upper ends are retained by cap members 15. The cap members are slidable vertically in guide rails 16 attached to the surface of the cylinder and include a manually operable spring loaded plunger mechanism 17 for selective engagement in vertically spaced-apart fixed holes 18 in the surface of the cylinder 12.

This arrangement permits the dispenser 11 to carry a mixed load of different length sonobuoys 13 as illustrated in FIG. 1.

The cylinder 12 is mounted for rotation about a central tubular pillar 19 (FIGS. 2 and 3) on a plurality of individual spaced-apart upper bearings 20 and a lower bearing 21. The pillar 19 extends vertically from a base plate 22 which includes a launch tube 23 which in operation is aligned with an aperture through the aircraft floor (not shown) to enable a selected sonobuoy 13 to be dropped by gravity when release is required.

Figure 2:
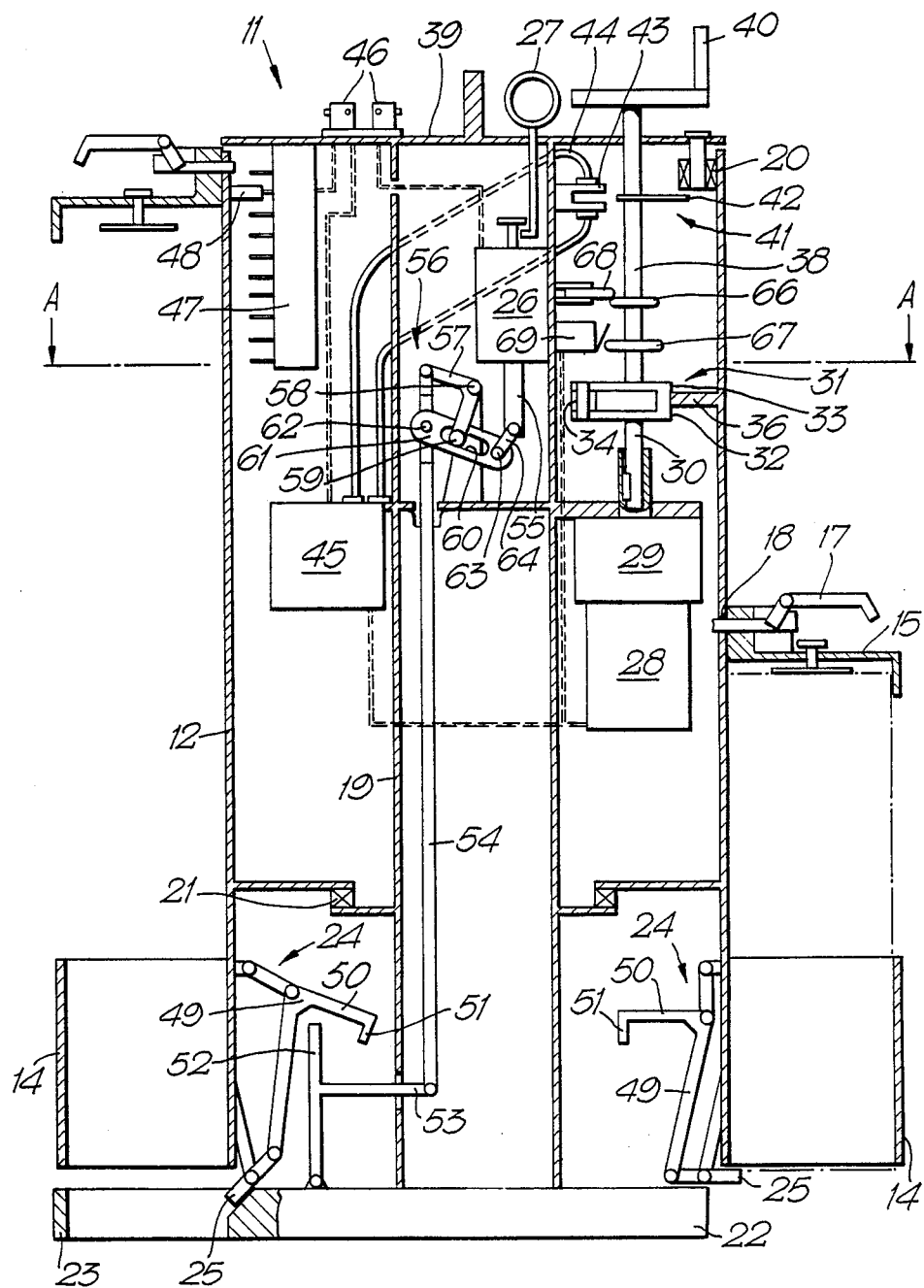
FIG. 2 is a composite generally schematic vertical cross section of the dispenser of FIG. 1.
Figure 3:
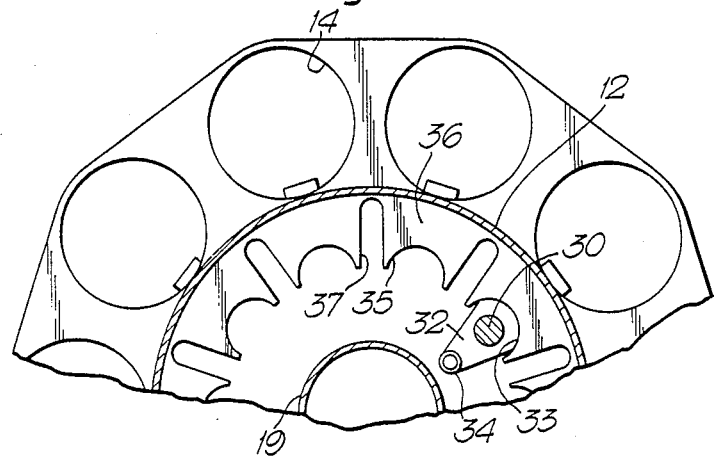
FIG. 3 is a sectioned view on arrows A—A of FIG. 2, and FIGS. 4a, b and c illustrates an operational sequence of part of the dispenser.

Each sonobuoy 13 is retained in its respective holder 14 by releasable retention means generally indicated at 24 in FIG. 2 and shown in its retaining position at the right of the drawing and in its release position at the left of the drawing. The retention means comprises a retention lever 25 pivotally mounted at the lower end of the cylinder 12 and operated through a mechanical linkage either by an electric solenoid 26 located internally of pillar 19 or a manual lever 27. Operation of the retention levers 25 will be described in more detail hereinafter.

A three phase 115/200 V AC motor 28 is attached to the external surface of the pillar 19, and drives a speed reduction gearbox 29 having an output drive shaft 30 which is operatively associated with a cylinder indexing means 31 comprising an internal geneva mechanism.

The geneva mechanism includes a rotor 32 connected to drive shaft 30 and having a convex semicircular indexing surface 33 at one end and a drive roller 34 at its other end. The indexing surface 33 cooperates during certain phases of operation with a concave mating surface 35 located internally of index plates 36 secured internally of the cylinder 12 at each sonobuoy location. A radially extending drive slot 37 is located between adjacent index plates 36.

An extension drive shaft 38 extends upwardly from the rotor 32 in axial alignment with drive shaft 30, its upper end protruding through a top cover plate 39 for connection to an operating handle 40.

Switching means 41 are provided and comprise a shutter 42 extending perpendicularly from the shaft 38 and rotationally fixed thereto. During rotation with shaft 38, the shutter 42 passes through a U-shaped light block 43 attached to the pillar 19 to interrupt a light beam transmitted through a fibre optic cable 44 from an electronics control unit 45.

Two spaced-apart discs 66 and 67 are rotationally fixed to shaft 38, the upper disc 66 co-operating with a spring detent 68 and the lower disc 67 with a microswitch 69.

The electronics control unit 45 is attached to the pillar 19 and is connected to electrical input connectors 46 on cover 39 for connection to an aircraft supply and to receive signals from a remotely located dispenser control unit. The unit 45 accepts signals from the fibre optic switching means 41 and includes electrical relays to switch the three phase power to the motor 28 (ON/OFF and direction reversal), a relay to apply a DC braking current to the motor and electronic logic to control the sequence and duration of the application of the DC braking current.

A bank of ten position microswitches 47 is mounted on the cover 39 for engagement during operation by switch strikers 48 located internally of the cylinder 12 at each sonobuoy location.

Reverting now to the releasable retention means 24, an outer end of each of the pivoted retention levers 25 protrudes, in the retention mode, partially across the lower end of each tubular holder 14 for engagement by the lower surface of the sonobuoy 13 as illustrated on the right side of FIG. 2. The inner ends are each pivotally associated with a spring loaded over-centre mechanism 49 which includes a radially inwardly extending lever 50 connected to the knee joint of the over-centre mechanism 49 and having an inner lip portion 51 for engagement, when aligned with the launch tube 23, with a bell crank lever 52 pivotally mounted on the base plate 22. Lever 52 includes a radially inwardly extending arm 53 pivotally attached internally of the pillar 19 to the lower end of a vertical rod 54, the upper end of which is operatively attached to the spindle 55 of linear solenoid 26 (FIG. 2), which is also attached at its other end to the manual release lever 27.

In the illustrated embodiment the solenoid spindle 55 is connected to the rod 54 through a force multiplying means generally indicated at 56. An upper end of rod 54 is pivotally attached to one arm of a right angled lever 57 which is pivotally anchored at 58 to the pillar 19. The end 59 of the other arm of lever 57 is restrained for sliding movement in a longitudinal slot 60 intermediate the ends of a lever 61, one end of which is pivotally attached at 62 to rod 54 and the other end is attached at 63 through a pivoted link 64 to the end of spindle 55 of solenoid 26.

The linear solenoid 26 is spring returned so as to reset immediately to the retaining position after each release action. Before release the spring force and the reacted mass of the sonobuoy hold the over-centre mechanism 49 locked as shown to the right of FIG. 2.

Indexing of the cylinder 12 is effected by a signal from electronics control unit 45 to energise the motor 28 which rotates through the reduction gearbox 29 the drive shaft 30 at a constant speed. Rotation of the shaft 30 rotates the rotor 32 of the geneva mechanism and the sequence of operation will now be described with reference to FIG. 4.

Figures 4A, 4B, 4C:
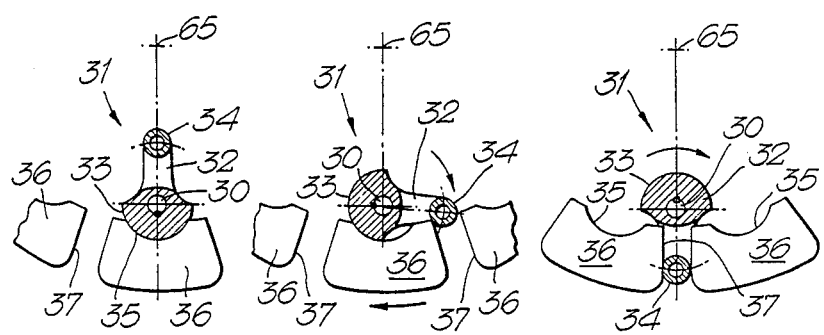

When in the position illustrated at A in FIG. 4 with the convex surface 33 of rotor 32 engaged with a mating concave surface 35 of index plate 36, the index plate 36 and therefore the cylinder 12 is effectively locked. 'A' in FIG. 4 illustrates an indexed sonobuoy dispensing position in which the axes of the drive shaft 30, roller 34 and an axis of rotation 65 of cylinder 12 are aligned, however, it will be clear that effective locking is retained throughout an arc of rotation of shaft 30. Clockwise rotation of the rotor 32 by drive shaft 30 to the position indicated at B in FIG. 4 initially unlocks the index plate 36 just as the roller 34 enters the inner end of drive slot 37. Further clockwise rotation engages the roller 34 in the slot 37 to drive the index plates 36 and attached cylinder 12 clockwise through the mid position indicated at C in FIG. 4, at which maximum rotational speed is achieved, to the position at which the next index plate 36 is securely locked with the parts in position as indicated at A in FIG. 4. Whilst the indexing operation has been described with reference to clockwise rotation it will be understood that operation is identical when counter-clockwise rotation is selected. Clearly, if the next selected sonobuoy dispensing position is not adjacent the previously selected position, rotation continues until the appropriate index plate 36 is reached.

Rotation of the rotor 32 causes rotation of extension shaft 38 which rotates the shutter 42 to interrupt the light beam across light block 43. This signals the electronics control unit 45 to apply a DC braking current to motor 28 to stop rotation of the cylinder 12 at the desired station.

When it is desired to release a sonobuoy 13, a signal from the dispenser control unit energises solenoid 26 which operates through the force multiplying means 56 to push rod 54 downwardly. This downward movement of rod 54 pivots lever 52 to engage lip portion 51 of operating lever 50 to operate over-centre mechanism 49 and pivot retaining lever 25 to release the sonobuoy 13 which drops through the launch tube 23 under gravity. Camming means (not shown) automatically reset the over-centre mechanism 49 and therefore the retaining lever 25 to the retaining position regardless of the next direction of rotation of the cylinder 12.

The efficiency of the release mechanism is enhanced by the force multiplying means 56. Thus the ratio of the distances between pivots 63 and 59 and between pivots 62 and 59 means that the downward movement of rod 54 is less than the initial upward movement of the spindle 55 at the beginning of the release stroke of the solenoid 26. The corresponding increased force applied to the rod 54 ensures that adequate force is available to immediately break the over-centre mechanism 49 to release the sonobuoy during initial movement of the spindle 55 at the time when the force being applied by solenoid 26 is at its minimum.

Manual release of a sonobuoy 13 is effected by pulling release ring 27 which operates to manually lift the spindle 55 of solenoid 26.

The cylinder 12 can be indexed manually through rotation of handle 40 which operates the geneva mechanism.

The geneva mechanism can be isolated by raising handle 40 which disengages the rotor 32 from index plate 36 and this leaves the cylinder 12 free to be rotated by hand as required for sonobuoy loading purposes. The handle 40 is retained in the raised position by disc 66 and spring detent 68, and disc 67 operates microswitch 69 to isolate electric motor 28 during this phase of operation.

Thus in the sonobuoy dispenser of this invention, the combination of the geneva indexing mechanism, fibre optic switching and the braking of drive motor 28 using a DC current provides for very fast and efficient indexing that is typically of the order of one second for movement between stations. Furthermore, the use of the geneva mechanism also provides an automatic locking facility at the selected station from the same power source, and the "internal" arrangement of the geneva mechanism in the described embodiment minimises the size and weight of the dispenser and the required installation space. The fibre optic switching system is insensitive to electronic interference.

Whilst one embodiment of the invention has been described and illustrated it will be apparent that many modifications may be made without departing from the scope of the invention as defined by the appended claims.

What is claimed is:

1. A sonobuoy dispenser comprising a tubular cylinder rotatably mounted concentrically of a central tubular pillar extending vertically from a base plate and having a plurality of sonobuoy support means longitudinally of its external surface, a three phase AC electric motor, an internal Geneva mechanism having a rotor and index plates, said motor rotating the rotor of the internal Geneva mechanism, the rotor having a convex semi-circular indexing surface at one end and a drive roller at its other end, the indexing surface co-operating during operation with a concave mating surface located internally of the index plates secured internally of the cylinder at each sonobuoy location and said drive roller cooperating during certain phases of operation with radially extending slots between adjacent index plates, fibre-optic switch means comprising a shutter rotatable with the cylinder and arranged to sequentially interrupt a light beam transmitted through a fibre-optic cable from an electronic control unit to switch the three phase power to the motor and apply a DC braking current to the motor, and release means for selectively releasing the sonobuoys from the support means.

2. A sonobuoy dispenser comprising a tubular cylinder rotatably mounted concentrically of a central tubular pillar extending vertically from a base plate, and having plurality of sonobuoy support means longitudinally of its external surface, a three phase AC electric motor, an internal Geneva mechanism having a rotor and index plates, said motor rotating the rotor of the internal Geneva mechanism, the rotor having a convex semi-circular indexing surface at one end and a drive roller at its other end, the indexing surface co-operating during operation with a concave mating surface located internally of the index plates secured internally of the cylinder at each sonobuoy location and said drive roller cooperating during certain phases of operation with radially extending slots between adjacent index plates, fibre-optic switch means to switch the three phase power to the motor and apply a DC braking current to the motor, and release means for selectively releasing the sonobuoys from the support means comprising linear solenoid connected by a mechanical linkage including a generally vertical rod having an upper end connected through a force multiplying means to the linear solenoid and a lower end connected through an over-centre mechanism to pivot a retaining lever at the lower end of each tubular holder from a retaining position partially obstructing the lower end of the tubular holder to retain the sonobuoy and a release position clear of the lower end of the tubular holder to allow the sonobuoy to be released by gravity.

3. A dispenser as claimed in claim 2, wherein said force multiplying means comprises a right angle lever pivoted to the pillar and having one arm pivotally attached to the upper end of the vertical rod and its other arm restrained for sliding movement in a longitudinal slot intermediate the ends of a lever having one end pivotally attached to the vertical rod spaced downwardly from said upper end and the other end attached through a pivoted link to a spindle operatively connected to said linear solenoid.

* * * * *